(12) United States Patent
Bucheru

(10) Patent No.: US 7,692,939 B2
(45) Date of Patent: Apr. 6, 2010

(54) CONTROL CIRCUIT

(75) Inventor: Bogdan T. Bucheru, Tucson, AZ (US)

(73) Assignee: DET International Holding Limited, Grand Cayman (KY)

( * ) Notice: Subject to any disclaimer, the term of this patent is extended or adjusted under 35 U.S.C. 154(b) by 139 days.

(21) Appl. No.: 11/092,527

(22) Filed: Mar. 28, 2005

(65) Prior Publication Data

US 2005/0212500 A1     Sep. 29, 2005

Related U.S. Application Data

(60) Provisional application No. 60/557,097, filed on Mar. 26, 2004.

(51) Int. Cl.
*H02M 7/00* (2006.01)
(52) U.S. Cl. .................................. 363/60; 323/207
(58) Field of Classification Search .......... 323/282–290, 323/267, 299, 268, 274, 207, 222; 363/20, 363/97, 131, 124, 89, 60, 61, 49, 98
See application file for complete search history.

(56) References Cited

U.S. PATENT DOCUMENTS

| | | | | |
|---|---|---|---|---|
| 5,309,082 A | * | 5/1994 | Payne | 323/270 |
| 5,483,656 A | * | 1/1996 | Oprescu et al. | 713/320 |
| 6,525,515 B1 | * | 2/2003 | Ngo et al. | 323/277 |
| 6,898,093 B2 | * | 5/2005 | Ambo et al. | 363/56.05 |

* cited by examiner

*Primary Examiner*—Rajnikant B Patel
(74) *Attorney, Agent, or Firm*—Venable, LLP; Robert S. Babayi

(57) ABSTRACT

In a control circuit for powering up a switching power supply into a powered output bus, the control circuit is built such that before a turning-on of the switching power supply the controller reference is the slave that follows the bus voltage which is the master. At the moment when the converter is turned on, the master/slave relationship changes such that after the turning-on of the switching power supply the output voltage of the switching power supply is the slave that follows the controller reference. Hence, the status of the output level is memorized by the voltage loop prior to start-up of the converter such that the conflict between the soft-starting voltage loop of the converter and the pre-biased output is minimized.

28 Claims, 10 Drawing Sheets

CONTROL CIRCUIT

CROSS REFERENCE TO RELATED APPLICATIONS

This application claims priority from provisional patent application Ser. No. 60/557,097 filed Mar. 26, 2004 in the name of Bogdan T. Bucheru entitled "Method and Circuits for Powering Up A Switching Power Supply Into A Powered Output Bus" incorporated herein by reference.

TECHNICAL FIELD

The invention relates to a control circuit and a method for controlling a switching power supply, the control circuit including a controller for controlling a switching of the switching power supply. The invention further relates to a switching power supply and an arrangement of at least two switching power supplies with such a control circuit.

BACKGROUND ART

One way of decreasing power consumption is to use lower supply voltage and this method is now often used for the new generations of microprocessors. Non-isolated voltage regulation modules (VRM) or isolated DC-DC converters must deliver now much more current and must sustain very high current transients. Telecom standard bricks are facing the same challenge too. As illustrated schematically in FIG. 11, paralleling more DC-DC converters 10 for current sharing to achieve high current capability and better power distribution is a preferred approach to supply low voltage high current power to power bus lines 12. This has become a standard solution for many applications. Besides current sharing and current transient control, one paralleling DC-DC converters has to take into consideration the start-up sequence and the impact of each converter's soft-start on the main power bus. The start-up sequence of the converter can be controlled, more or less, at the system level; but the soft-start behaviour is an internal matter of each converter and must be dealt with at this level.

Powering up in non-zero output condition has become an important issue for paralleled converters in power bus systems. Regular switching power supplies need to have a soft monotonic start up and they are using synchronous rectification in order to reach high efficiency. When paralleling more synchronous rectification converters into power bus systems, the problem of current sharing and start up sequence control can be handled at system level, but the internal soft start of converters is in conflict with the powered bus and this problem must be dealt with at each converter level.

The capability of synchronous rectification converters to process power bi-directionally becomes a drawback when the internal regulation point of the converter does not coincide with its output level. Typically, a converter's output voltage follows a reference voltage. When the output level on the bus is already higher than the one set by the reference of the converter, the energy starts to flow backwards, from the output to the input of the converter. In transient situations, as the soft start of converter, there is nothing to limit the backwards surge of power; the power bus is perturbed by it and the converter itself can be damaged or even destroyed.

Prior art methods operate by controlling the way in which synchronous rectifiers become active or the moment when they are enabled. The practical solutions are many times complex and the results are limited. Some power bus systems have an independent switch to connect each converter only after the soft start is finished; the cost is affected and the system efficiency too, especially for low voltage and high current power buses.

The Typical Soft Start

A regular converter needs an internal soft-start control in order to eliminate the transient behavior at turn-on. FIG. 1 illustrates turn-on without soft start control. Here, a 3.3V unit is protected only by its current limit feature. Channel 1 represents the output voltage (2V/div) and Channel 2 represents the output current (20 A/div). The evident over-shoots and oscillations need to be eliminated. An increasing monotonic shape of output voltage has to be achieved.

As illustrated in FIG. 2, the logarithmic shape given by a RC circuit is one of the most popular solutions for the internal soft starting reference of converters. For obtaining a soft-start the majority of designs assure a soft rise of a reference 20 that controls the voltage loop, forcing the output 21 to follow it. Charging a capacitor through a resistor offers a nice shape and the control loop will follow this shape.

One can see that, using this logic, the voltage loop reference 20 is the master and the output 21 is the slave, as shown in FIG. 2. The voltage control loop is forcing the output 21 to follow the reference 20 and the soft start shape of the output 21 is obtained. For the majority of today's converters the soft-start control presumes a close to zero output voltage at turn-on T0, as shown in FIG. 2.

This condition is not fulfilled when a pre-bias 25 is presented on the output as illustrated in FIG. 5 and the initial output voltage on the power bus must be taken into consideration. The pre-bias 25 is present when the DC-DC converter is connected to a powered bus where it powers up. Within the converter the reference 20/output 21 relationship has a master/slave characteristic and the converter will force the output 21 to come close to the reference 20 level no matter what. The pre-bias 25 condition of the output 21 conflicts with the transient regulation point of the converter, resulting in a back flow of the energy and a drop 26 of the initial output voltage. The initial difference results in a discharging of the output capacitors and recharging them back as the reference 20 rises. It is a clear waste of energy. When the pre-biased output is sustained by a power bus, the output voltage cannot drop and the conflict is even stronger.

As mentioned, all synchronous rectifier converters have the capability to process power in both directions and this can be an advantage or a disadvantage over normal rectifier converters. Synchronous rectifier converters have higher overall efficiency and they can easily work with light or no load. Of course, the synchronous rectifiers are more complex and more expensive, but the present increase in demand of low voltage and high current power supplies have made them the best solution in computers, data and telecommunication fields.

When a synchronous rectifier converter has on its output a higher voltage than the one its voltage loop is trying to regulate the result will consist in a backward power flow—from the output to the input. This power flow is a disadvantage especially when this energy is taken from a powered bus, in fact from other converters that sustain this bus. The overall efficiency will decrease dramatically and the stability of the entire system can be jeopardized. Normally a current sharing circuitry is managing the steady-state running of the power bus, forcing all the converters to match the bus voltage. Yet some errors still appear.

The turn-on behavior of each converter is normally out of the current sharing control. Because the individual soft-start does not take in consideration the real level of output voltage —the bus voltage—an important difference is appearing between the voltage loop target—starting from zero—and the output voltage. A huge instantaneous backward power flow can appear in this situation and, beside the inconvenience of loosing useful power and over—stress the power bus, this can be dangerous for the converter itself. The current limit protection of the converters is normally unidirectional and it cannot control the current flowing back. Some power buses have an active switch for each converter output in order to prevent such conflicts, but this solution is costly and decreases the total efficiency of the system.

A practical solution consists in disabling the synchronous rectifiers of the converter at the beginning of a turn-on sequence, so the power flow is forced internally to be unidirectional. Even so, a new problem is generated when the synchronous rectifiers are activated because a perturbation will be generated into the voltage loop control. This affects directly the normal soft-start shape of the converter. The moment when the synchronous rectifiers are enabled is also important. For a voltage mode controlled converter (VMC) the variation between a body diode voltage drop and a low voltage drop across a power MOSFET will produce a change in the loop condition and its gain. The proportion of output perturbation depends on voltage loop speed and the percentage relationship of synchronous rectifier body diode drop to the output. The direction of this perturbation depends on load condition; a discontinuous current of the output inductor prior to synchronous rectifier activation will generate an output voltage drop, pushing energy backward, and a continuous current of the output inductor prior to activation will generate an output voltage boost. A feed-forward compensation can help to minimize this perturbation, eliminating the impact of "on time", but the "off time" of the switching period will still be influenced by the synchronous activation.

A current mode control (CCM) can help in minimizing the output perturbation, but this kind of control is not always easy to implement and may not be cost acceptable. Some other drawbacks can appear, as slow response for output current transients.

A second solution is used to solve the back flow problem, consisting in a "soft activation" of the synchronous rectifiers. This method controls the voltage applied on MOSFET gates, trying to modulate the channel conductivity. The translation between disable and fully enable must be soft enough for the voltage loop to keep control of the output. Some improvement can be achieved using this solution, but there are limitations.

First, today's power MOSFET gain around the turn-on threshold is too big for a good linear modulation of channel conductivity. Second, the channel resistance to begin with is too small for its modulation to have an important effect. The performances of a 1.8V/30 A Telecom eight brick, available on today market and featuring a "soft activation" control, are next analyzed.

The level of flowing back current when the unit starts in a pre-bias voltage of 80% of its own nominal output was chosen as a first analysis criteria. A 30,000 μF capacitance was used to force the pre-bias voltage on converter. FIG. 3 presents the results. Channel 1 represents the output voltage (1V/div) of the converter and Channel 2 represents its output current (20 A/div).

For more than 500 μs the converter is pushing back current and the initial peak is reaching a negative level of −23 A. The negative current is limited by the "softness" of the synchronous rectifiers. FIG. 4 shows the same unit starting-up in a 100% pre-biased output voltage, which represents the second analysis criteria. The push back time extends to almost 1 ms and the negative peak current reaches −54 A, far more than the normal maximum current. Such a high current is unacceptable in normal running and is for sure very dangerous when it flows in the opposite direction.

The voltage perturbation of the capacitive bus is obvious and its drop also helps in limiting the negative current. For a real powered bus the voltage drop will be minimized, but the level of negative current will be higher. There is a big chance for the negative power flow to exceed the maximum tolerable level of the converter.

Many pulse width modulation (PWM) ICs have a fully integrated soft-start control and many others have a soft-start behavior controlled by several external components. The first kind minimizes the cost but reduces the flexibility. The second offers more flexibility, but increases the cost. Sometimes designers choose a complete independent soft-start circuitry in order to achieve better performances and maximum of flexibility at the expense of price.

In all these cases the voltage soft-start has to assure an increasing monotonic shape for the output, from zero to the nominal voltage. The over-shoots and oscillations must be eliminated, and if the output current does exceed the maximum value, the current limit protection must take over the control. Charging big output capacitors is a challenge that today's converters must meet. The logarithmic shape given by a RC circuit is one of the most popular solutions. Linear shape or multiple slopes shapes are also used. New digital controllers can also provide solutions. However when converters turn on into a powered bus a "classic" voltage soft-start circuitry is unable to control the flow of power.

SUMMARY OF THE INVENTION

It is an object of the present invention to create a control circuit pertaining to the technical field initially mentioned, that minimizes the conflict between the soft-starting voltage loop of the converter and the pre-biased output.

In an embodiment of the present invention, as illustrated schematically in FIG. 12, a control circuit 114 is built such that before a turning-on of a switching power supply 110 the controller is regulated by a voltage $V_{out}$ of a powered output bus 112 and after the turning-on of the switching power supply, an output voltage of the switching power supply is regulated by the controller.

Since the status of the output level is known and memorized by the control circuit, i.e. the voltage loop prior to start-up of the converter, the conflict between the soft-starting voltage loop of the converter and the pre-biased output is minimized. When the regulation point of the voltage loop coincides with the output level no conflicts can appear. The master-slave relationship prior to the start-up is changed. Before the turning-on of the power supply, the output is the master and the voltage loop is the slave.

Accordingly, the control circuit learns the output level prior to turn-on and starts to control from that point. If the duty cycle of a synchronous rectifier converter matches the output level from the beginning, no conflict will appear with the powered bus. A built in soft-start pulse width modulation (PWM) IC cannot be forced to learn the output status, so it cannot be used for this purpose. An independent soft-start circuitry is more suitable for achieving this goal.

Generally, different types of control circuits may be used such as for example proportional, integrative or derivative controllers. In a preferred embodiment of the invention, a control circuit with a PID (proportional-integrative-derivative) controller is used.

An advantageous implementation of a PID controller includes an operational amplifier (OPAMP) where the appropriate electric and/or electronic elements are connected to the inputs and the outputs of the operational amplifier.

For memorizing the output condition of the switching power supply before turn-on, the control circuit includes a capacitive element, for example a capacitor.

There exist different types of voltage loops. In a first embodiment of the invention, a normal PID controller including a soft start capacitor for achieving the soft start of the converter has been modified. In this case, the soft start capacitor is connected between an input of the controller, for example the non-inverting input of an OPAMP, and ground.

Instead of providing two different capacitors, the above mentioned capacitive element and this soft start capacitor are in a preferred example of such an embodiment of the invention, identical.

In a further advantageous example the control circuit includes a switching element such as for example a switch. The control circuit is built such that this switching element is switchable at the moment, when the converter is turned on, that is when a given condition of the converter inputs and/or outputs and/or other variables is fulfilled. Before the turning-on of the switching power supply, the controller is regulated by the voltage of the output bus that is the output is the master and the controller is the slave that follows the master. After the switching element is switched, that is after the turning-on of the switching power supply the output voltage of the switching power supply is regulated by the controller that is the output is the slave that is regulated by the controller.

The control circuit is preferably built such that a bias voltage is connected to ground via a resistor and the switching element. When the switching element is closed before the turning-on of the power supply, the bias voltage is connected to ground and the level of a reference voltage at an input of the controller, for example the non-inverting input of the OPAMP, is determined by the bus voltage. When the converter is turned on, the switching element is opened and then the level of the reference voltage at this input of the controller is no longer determined by the bus voltage, but by the bias voltage.

In order to memorize the output condition, the control circuit includes a resistor that is connected between the output voltage of the converter and this reference voltage. Prior to turn-on, the capacitive element can then be charged from the bus voltage via this resistor.

The control circuit further includes means for limiting the level of the reference voltage such as for example a zener diode connected between the reference voltage and ground. Because of its simplicity, a zener diode is preferred. However, it is also possible to use any other means such as for example varistors, voltage regulators or other suitable means for limiting a voltage to a maximum value.

In another type of voltage loop, the normal soft start is achieved by limiting the slope of the output voltage. For this purpose, the control circuit includes a slope limiting capacitor that is connected between the output voltage and an input of the controller, for example the inverting input of an OPAMP.

Instead of providing two different capacitors, the above mentioned capacitive element and this slope limiting capacitor are in a preferred example of this type of control circuit, identical.

In a further advantageous example according to this second type of control circuit, the control circuit includes a resistor that is connected between the output of the controller, for example the output of the OPAMP, and the above mentioned capacitive element. Before turn-on of the converter, the capacitive element (or in the preferred embodiment the slope limiting capacitor) is charged by the controller output via this resistor until the voltages at both inputs of the controller (both inputs of the OPAMP) are equal such that this capacitor memorizes the output condition.

A switching power supply according to the invention includes a control circuit as described hereinbefore such that the power supply can be controlled to power up while its output is connected to a non-zero output level.

In a preferred implementation of such a switching power supply, the switches of the power supply are controlled by a pulse width modulator (PWM) that is the PWM for example controls the duty cycle of the switches of the switching power supply.

In another preferred implementation of such a switching power supply, an output capacitor is connected to an output of the switching power supply. The output capacitor can either be internal of the power supply or it can be an external output capacitor.

The typical arrangement according to the invention therefore includes at least two switching power supplies connected in parallel where the output of each power supply is connected to a common output bus. Here, at least one of these switching power supplies includes a control circuit as described hereinbefore such that this power supply may be powered up into the powered output bus. It is also possible to have two or more switching power supplies connected in parallel to a common output bus where one or more output capacitors are connected to the output of a power supply.

It is a further object of the invention to create a method pertaining to the technical field initially mentioned that allows to minimize the conflict between the soft-starting voltage loop of the converter and the pre-biased output.

The solution of the invention is specified by the features of claim 17. According to the invention, in the method for powering up a switching power supply a controller of said control circuit is regulated by the output bus voltage before the switching power supply is turned on. And after the switching power supply is turned on the output voltage of the switching power supply is then regulated by the controller.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

DETAILED DESCRIPTION

An ideal "smart" soft-start circuitry will pre-bias itself according to the output voltage before the unit turns on. The master-slave relationship must change before and after the turn on decision. In this way the reference value and the output are matching preliminarily and the voltage loop takes control in the right moment and from the right spot.

Figure 6:
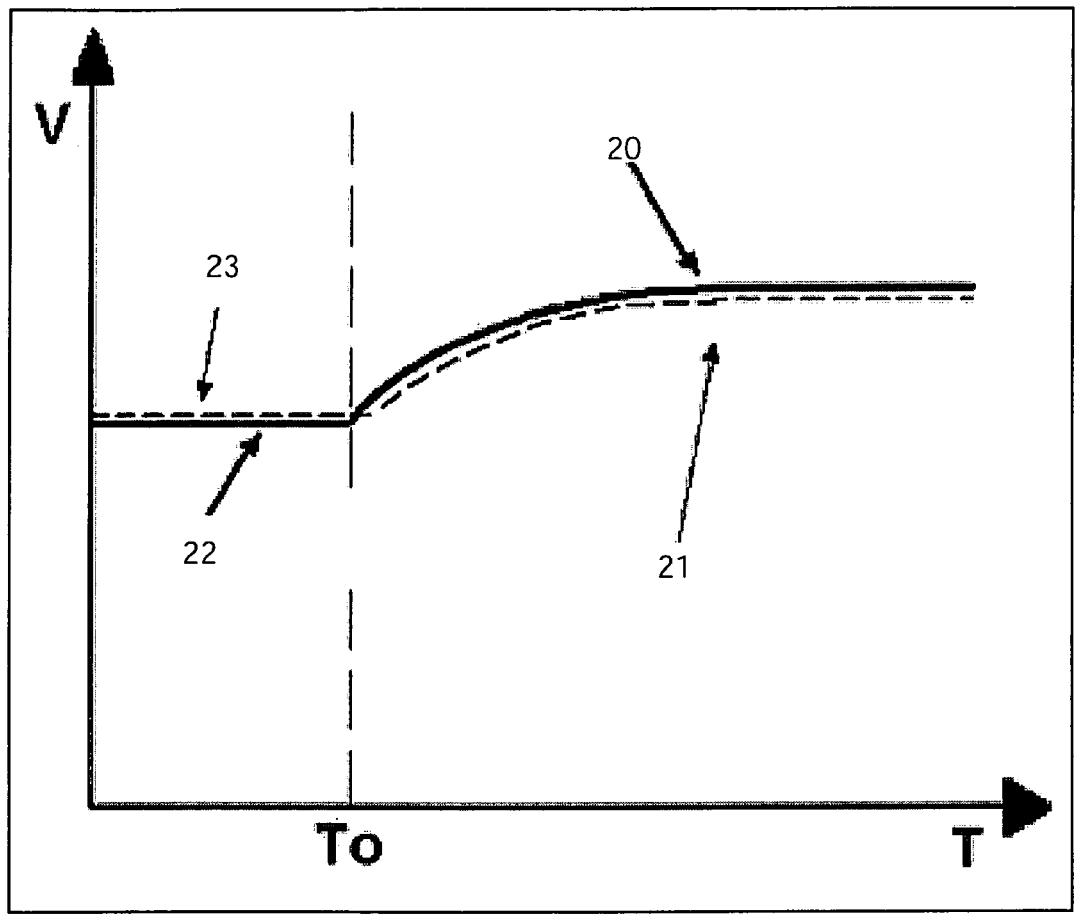
FIG. 6 is a plot of soft start behavior of a DC-DC converter with pre-bias condition for a "smart" voltage loop in accordance with the present invention.

As shown in FIG. 6, the control circuit is built such that before a turning-on T0 of the switching power supply the controller reference 22 is the slave that follows the bus voltage 23 which is the master. At the moment when the converter is turned on T0, the master/slave relationship changes such that after the turning-on T0 of the switching power supply the output 21 voltage of the switching power supply is the slave that follows the reference 20. Hence, the status of the output level is memorized by the voltage loop prior to start-up of the converter such that the conflict between the soft-starting voltage loop of the converter and the pre-biased output is minimized.

The proposed solution provides good performance acting inside on the voltage loop of converter and without interfering with the mode of operation of the rectifiers. The main advantages consist in simplicity and no restraint regarding the drivers of the synchronous rectifiers.

Figure 7:
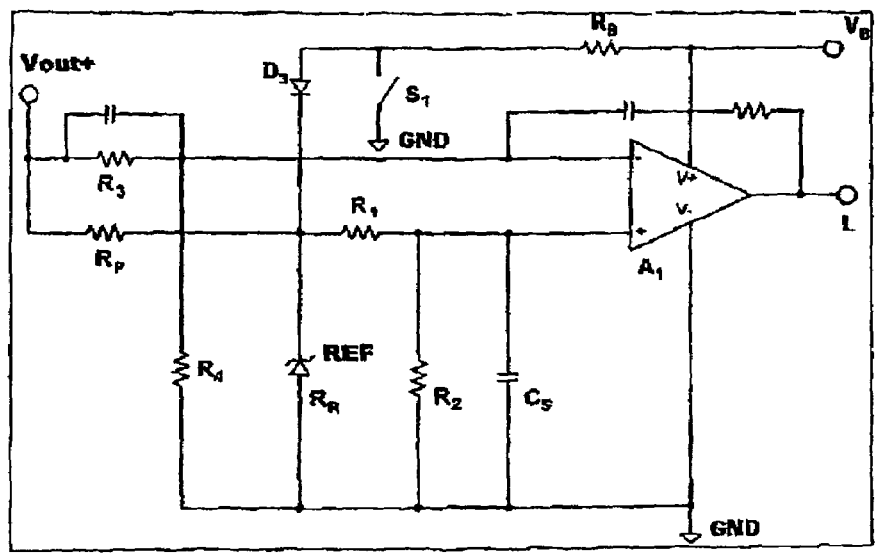
FIG. 7 is a circuit diagram of a modified Proportional-Integrative-Derivative voltage loop control for a "smart" reference in accordance with an exemplary embodiment of the present invention.
Figure 12:
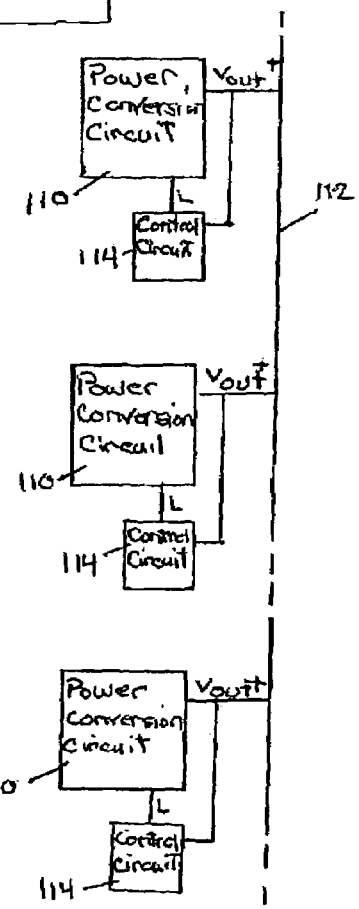
FIG. 12 is a block diagram of parallel power conversion circuits serving a bus and having control circuits in accordance with the invention.

The method according to the invention has been implemented in an exemplary embodiment in standard Telecom bricks, requiring a minimum change of circuitry. One of the several practical embodiments is presented in FIG. 7. A normal proportional-integrative-derivative (PID) control has been modified for performing the needed supplementary function.

Figure 1:
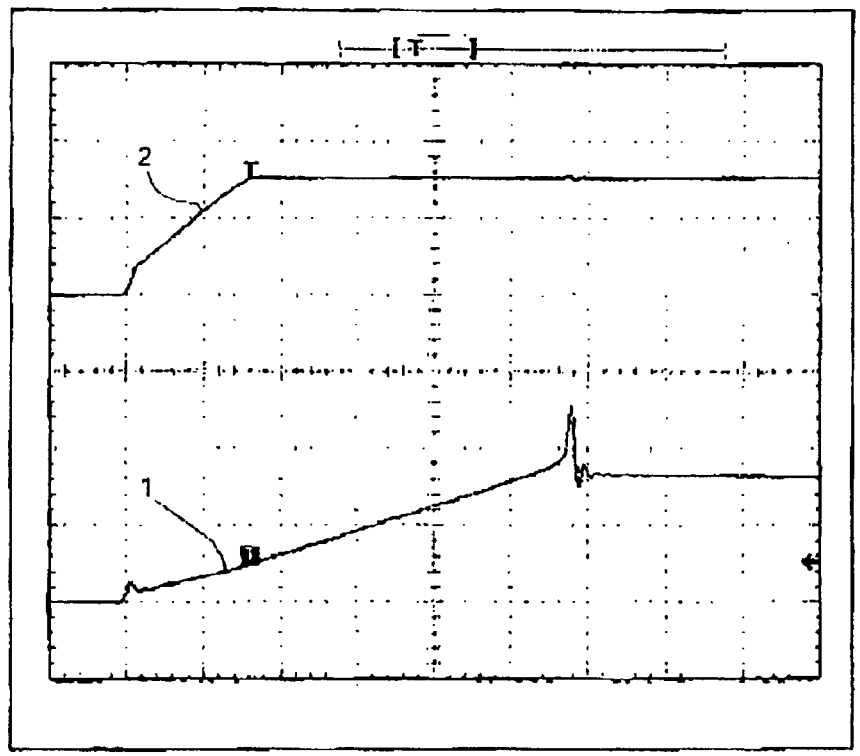
FIG. 1 is a plot illustrating DC-DC converter turn-on behavior without voltage soft-start control.
Figure 11:
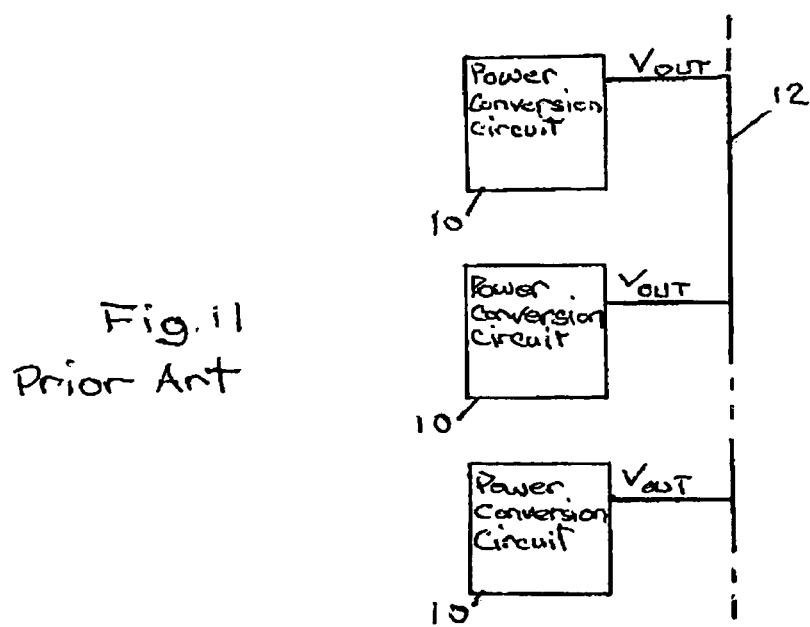
FIG. 11 is a block diagram of parallel power conversion circuits serving a bus in accordance with the prior art.
Figure 2:
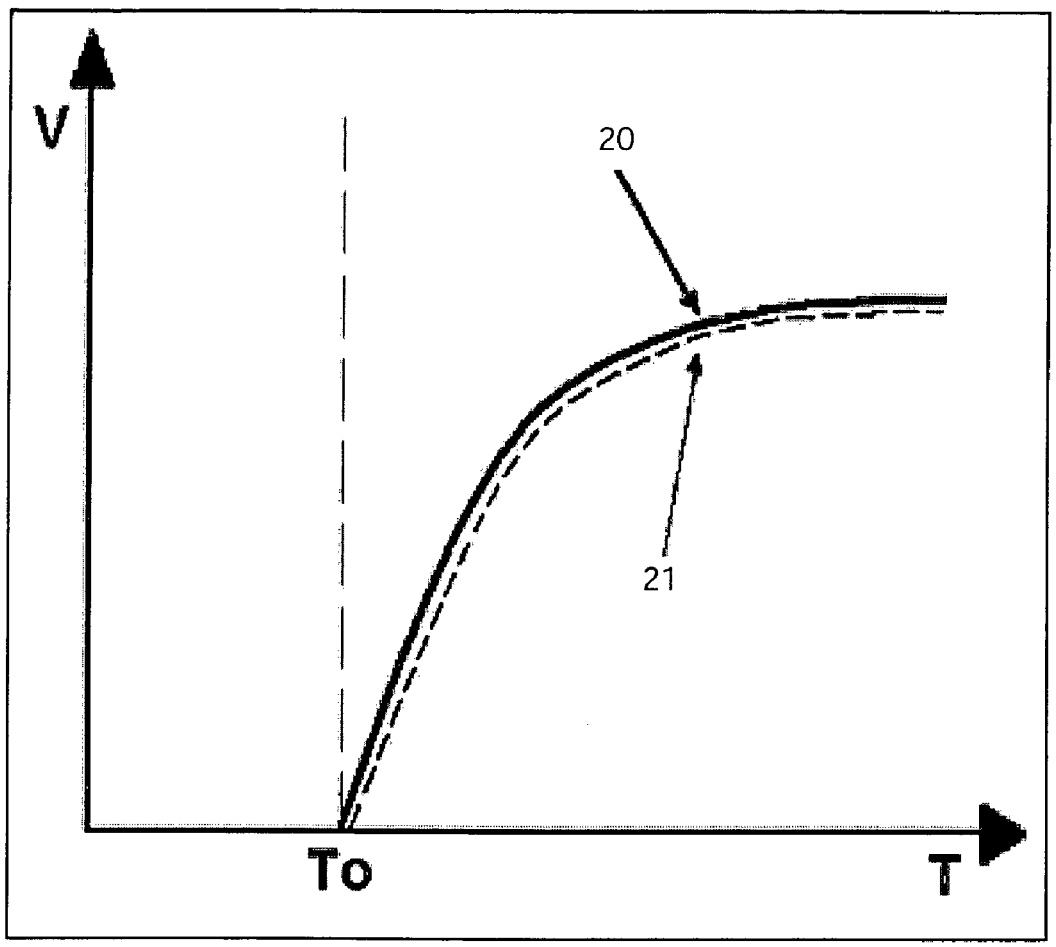
FIG. 2 is a plot illustrating normal soft-start, output-to-reference relationships of a prior art converter.
Figure 3:
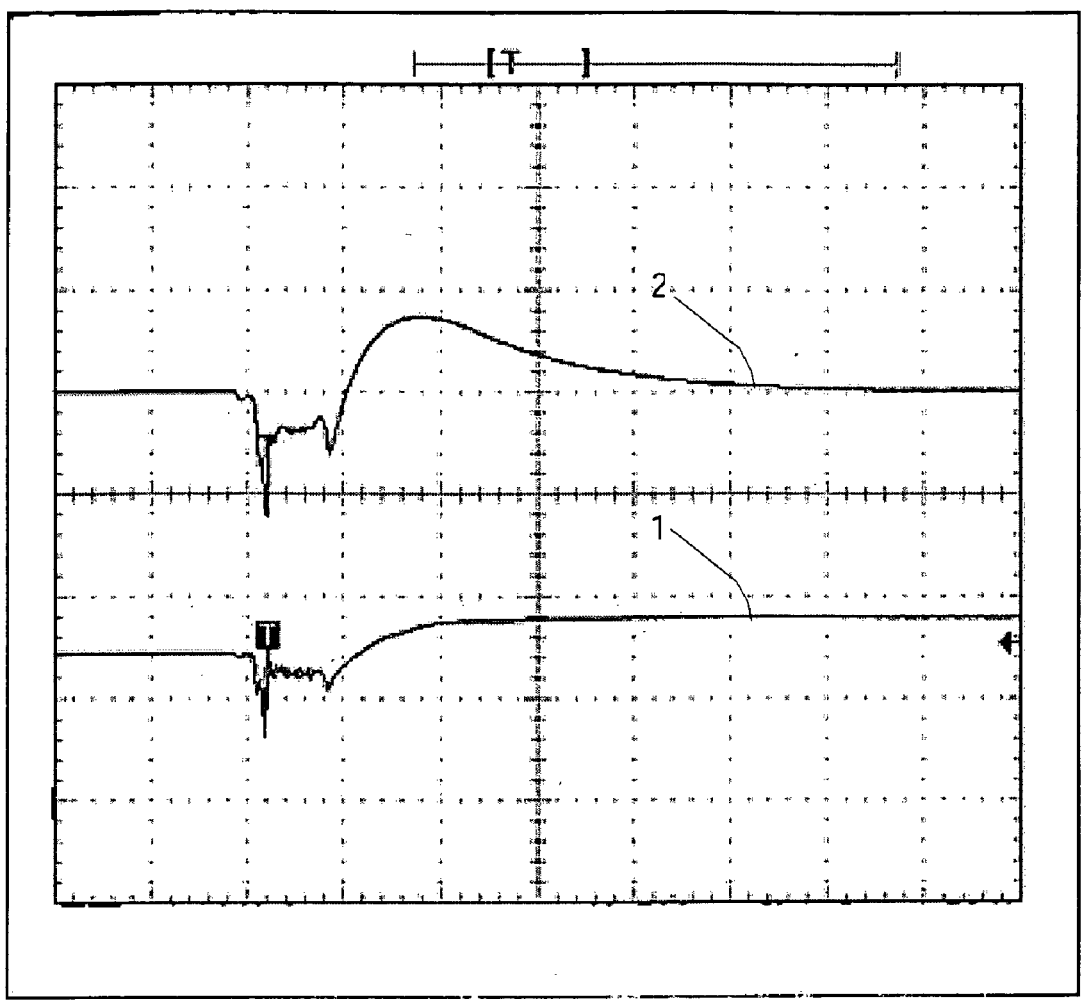
FIG. 3 is a plot showing the start-up behavior in an 80% pre-bias for a "soft activation" converter.
Figure 4:
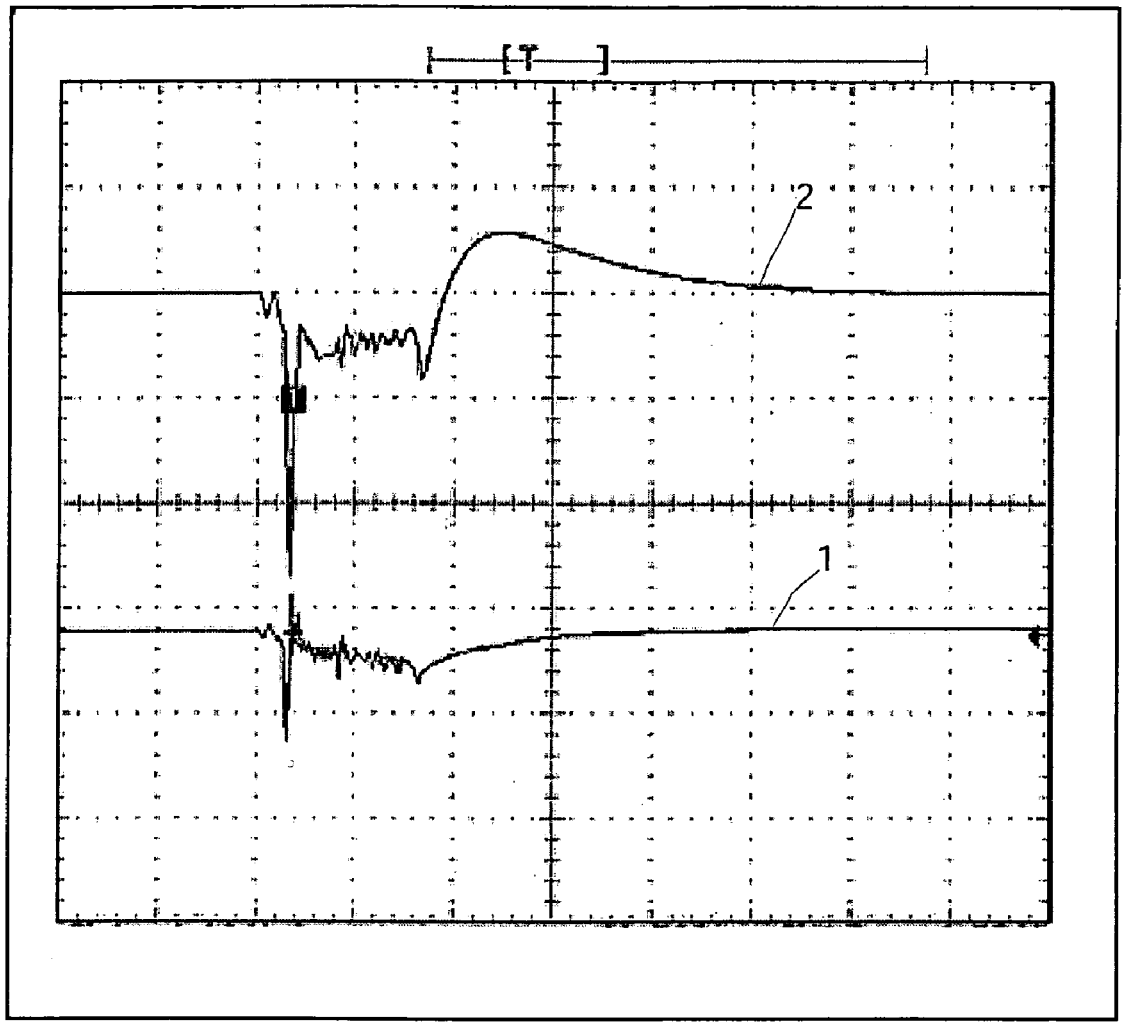
FIG. 4 is a plot showing the start-up behavior in a 100% pre-bias for a "soft activation" converter.
Figure 5:
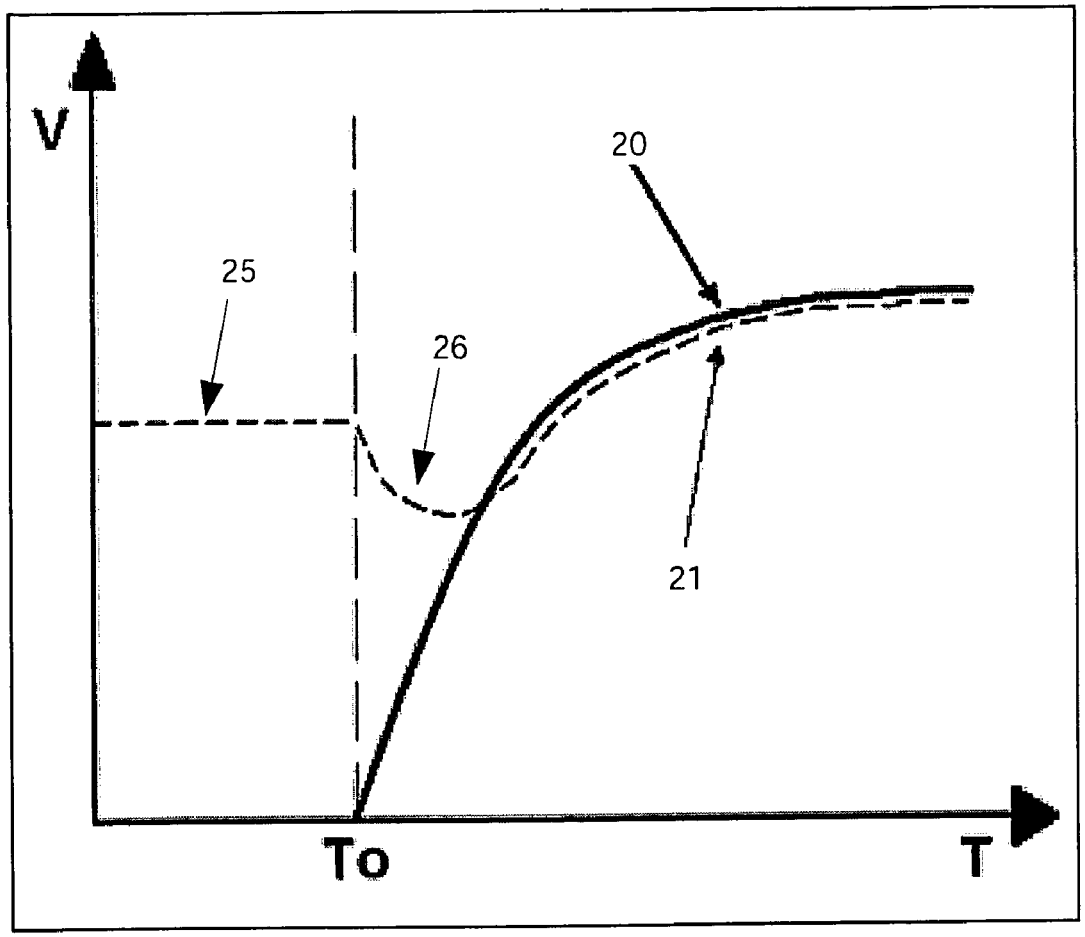
FIG. 5 is a plot of soft start behavior with a pre-bias condition of a prior art converter.

In the modified (PID) voltage loop control circuit of this preferred exemplary embodiment of the invention, when the normal soft start is achieved by using an RC type circuit as shown in FIG. 2, the soft start capacitor $C_S$ represents the main element. Adding only one bleeding resistor $R_P$ between the output voltage $V_{out}$ and the reference REF (across zener diode $R_R$) will force the soft start capacitor $C_S$ to memorize the prior-to-power up output condition through resistor $R_P$, and the voltage divider with resistors $R_1$, $R_2$. The switch $S_1$, one terminal being connected to ground GND and the other terminal via a diode $D_3$ to the reference REF and via a resistor $R_B$ to a bias $V_B$, keeps the reference REF disconnected until the converter starts, so it plays no major role before start-up. The switch $S_1$ is activating the reference only when the unit starts-up. Before that, the non-zero output voltage $V_{out}$ has already pre-biased the soft-start capacitor $C_s$.

For this practical solution to work the nominal output voltage of the converter must be equal to or greater than the reference voltage. This condition is fulfilled for the majority of designs. The theoretical pre-biased condition is given by:

$$\frac{R_4}{R_3+R_4} = \frac{R_2}{R_1+R_2+R_P} \quad (1)$$

Fulfilling this condition will make the non-inverting and inverting inputs of operational amplifier $A_1$, where its powering inputs are connected to the above mentioned bias $V_B$ and ground GND, match before the unit starts up. The loop output L of the operational amplifier $A_1$ is the signal that controls the switching of the switching converter. Some extra, routine and known-in-the-art measures could be needed for keeping operational amplifier $A_1$ out of saturation; the speed of operational amplifier $A_1$ taking control determines the performances of this particular solution. In reality, the reference device can play some role too. It is not fully activated when pre-biased from output, but it can be considered as a non-linear impedance, implemented as a zener diode $R_R$. The pre-biased condition becomes:

$$\frac{R_4}{R_3+R_4} = \frac{(R_1+R_2) \| R_R}{R_P+(R_1+R_2)\| R_R} \cdot \frac{R_2}{R_1+R_2} \quad (2)$$

When $R_R \gg (R_1+R_2)$ one can use equation (1) as a good approximation. For reference ICs commonly used, such as TL431, the minimum regulation current is today less than 100 μA, so in many situations this current can be neglected.

Figure 8:
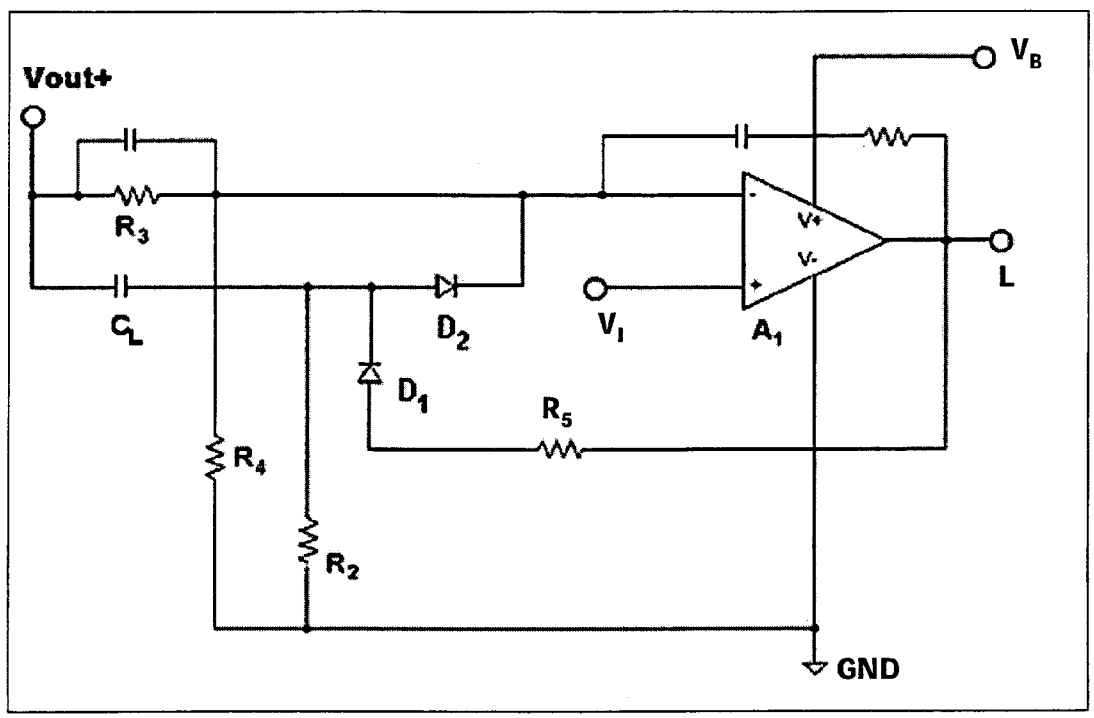
FIG. 8 is a circuit diagram of a modified Proportional-Integrative-Derivative voltage loop control for a "smart" dV/dt output limit in accordance with a further exemplary embodiment of the present invention.

When the normal soft start is achieved by using a capacitive dV/dt limit for the output slope, the output level can be memorized by the slope limiting capacitor $C_L$ and this can be done by adding just one resistor $R_5$ and one diode $D_1$, in the preferred exemplary circuit illustrated in FIG. 8. Before start-up the operational amplifier $A_1$ reaches equilibrium by maintaining its inputs at the same voltage level, which is defined by input reference voltage $V_I$ level. Operational amplifier $A_1$ output is charging the slope limiting capacitor $C_L$ with a voltage proportional with the difference between input reference voltage $V_I$ level and the output voltage $V_{out}$ level it is doing so because the DC negative feedback realized through $R_5$, $D_1$ and $D_2$, $R_2$, $R_3$ and $R_4$. When the soft start begins, the sum of output voltage $V_{out}$ and the voltage across the slope limiting capacitor $C_L$ matches the input reference voltage $V_I$ level. When the soft start ends, the DC negative loop is broken and the slope limiting capacitor $C_L$ no longer affects the behavior of operational amplifier $A_1$.

Non-isolated or secondary-side controlled isolated converters can easily use such a "smart" soft-start control. There are also practical solutions for primary-side controlled DC-DC converters. AC-DC converters can also benefit from this technique.

A family of Telecom 75 W eight bricks has been designed to have a pre-biased reference. The output voltages vary between 1V and 5V. The 5V/15 A brick is used next as experimental example.

Figure 9:
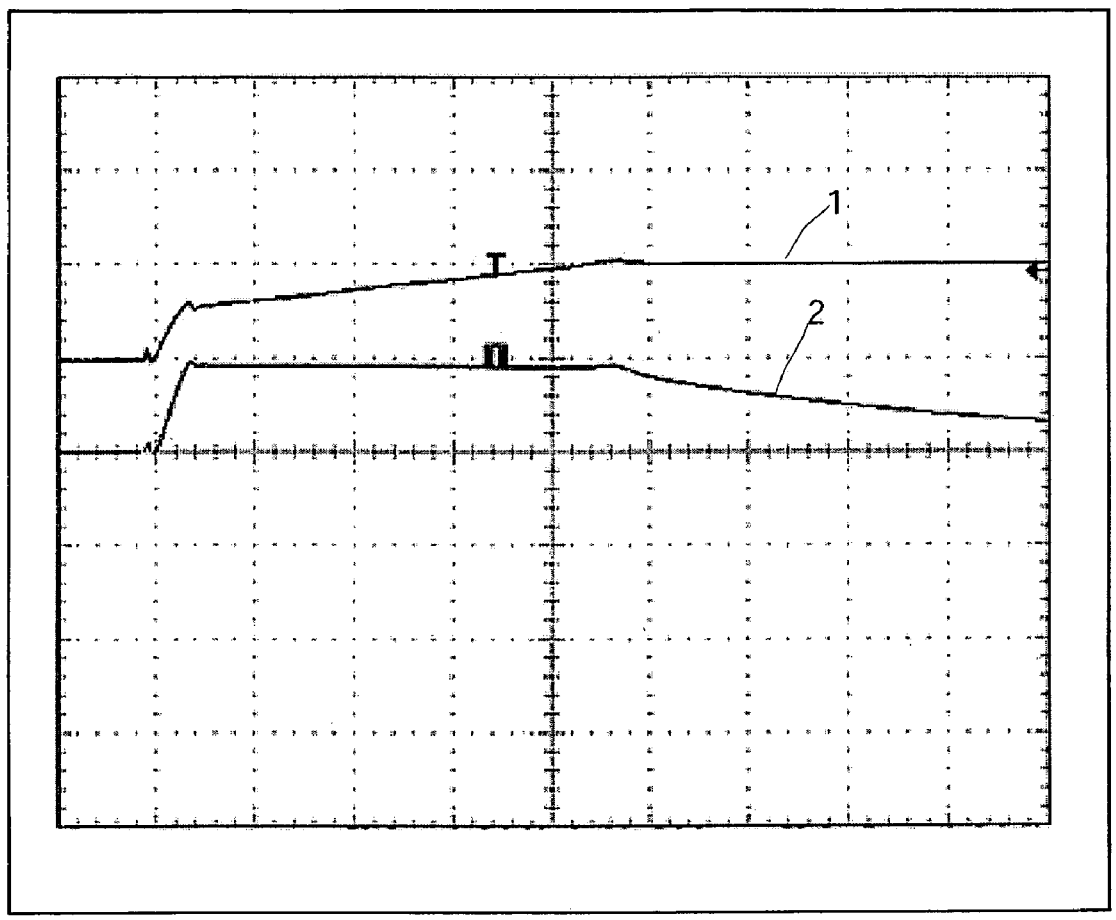
FIG. 9 is a plot of results for the start-up behavior in an 80% pre-biased output for a "smart" 5V converter according to the present invention.

FIG. 9 shows a start-up behavior when a 30,000 μF external capacitance was pre-biased to 4V—80% of nominal output voltage. Channel 1 represents the output voltage (1V/div) and Channel 2 (20 A/div) represents the converter output current. It is obvious that the converter starts to deliver positive current from the beginning. No backward flow of power appears and, as a consequence, no uncontrollable stress occurs on the converter or on the powered bus.

The positive output current is limited by the internal current limit function. An initial output voltage temporary overshoot is due to the finite speed of the loop.

Figure 10:
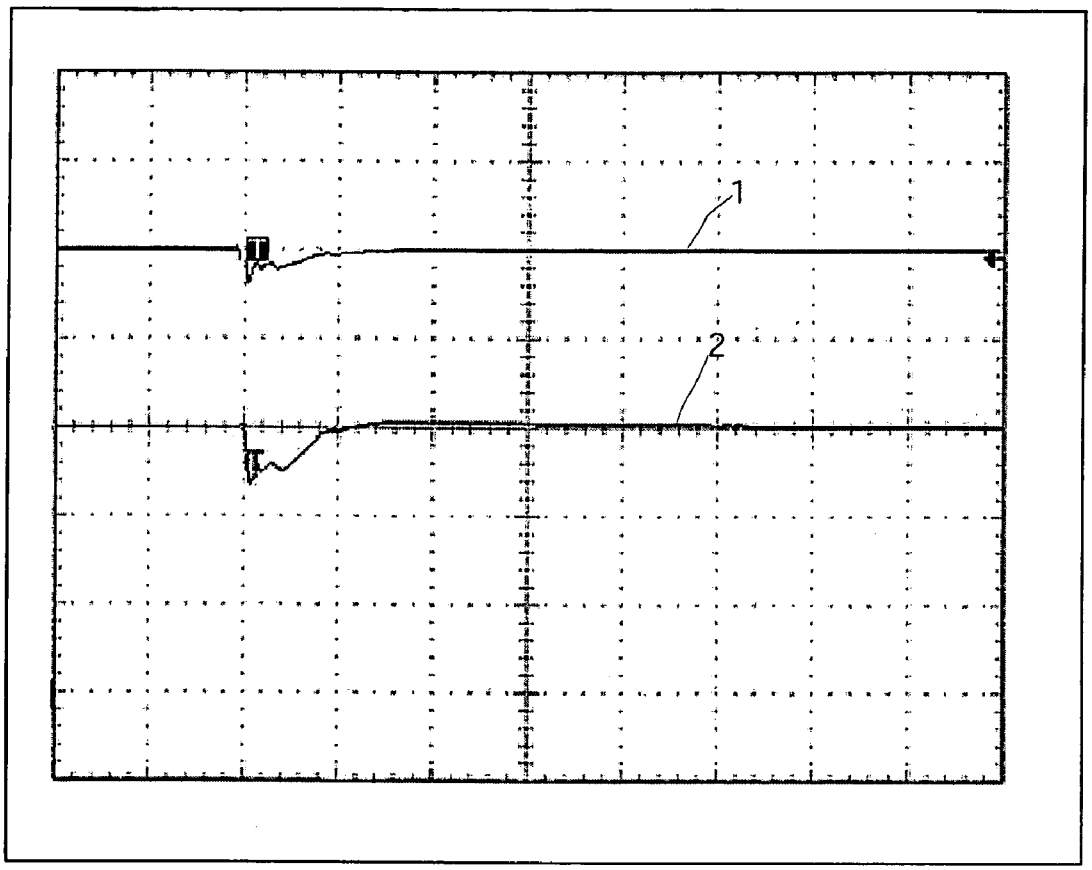
FIG. 10 is a plot illustrating results for the start-up behavior in a 100% pre-biased output for a "smart" 5V converter according to the present invention.

The Start-up of the same 5V brick has been tested with 100% pre-biased output. The results are shown in FIG. 10. One can see a negative output current (channel 2) having a peak of −12 A and a voltage drop (channel 1) on output. This peak level is under maximum nominal current of the unit, so the unit is not over-stressed. These are results of finite speed of the voltage loop operational amplifier; the sooner the loop takes control, the smaller is the energy pushed back by the converter. In this example less than 200 μs are needed for complete control.

Powering up of the synchronous rectifier converters into a powered bus can be well controlled by a voltage loop that features a "smart" soft-start solution. This method has large adaptability and the circuitry complexity is small or moderate. One can see that the method and circuit of this invention assures a perfect start-up independent of a pre-bias situation of the output. In real life there are limitations which can vary from design to design. Nevertheless, controlling the reference status before turn-on provides very good results with a minimum cost increase.

While exemplary, preferred embodiments of the invention have been described, it will be appreciated that modifications and variations in the methods and circuitry described can be made by those skilled in the art without departure from the spirit and scope of the invention as will be set forth in the claims of a complete utility patent application directed to this invention and that will claim priority from this provisional patent application.

The invention claimed is:

1. A control circuit for powering up a switching power supply comprising:
   a controller that controls a switching of a switching power supply and is connected to a powered output bus,
   wherein the control circuit is configured such that before a turning-on of the switching power supply the controller is regulated by a voltage of said powered output bus and after the turning-on of the switching power supply an output voltage of the switching power supply is regulated by the controller.

2. The control circuit according to claim 1, wherein the controller is a Proportional-Integrative-Derivative controller.

3. The control circuit according to claim 1, wherein the controller includes an Operational Amplifier.

4. The control circuit according to claim 1, wherein the control circuit includes a capacitive element for memorizing an output condition of the switching power supply.

5. The control circuit according to claim 1, further comprising a soft start capacitor connected between an input of the controller and ground.

6. The control circuit according to claim 4, wherein said capacitive element is a soft start capacitor.

7. The control circuit according to claim 5 or 6, wherein the control circuit includes a switching element that is switchable at the turning-on of the switching power supply such that before the turning-on of the switching power supply the controller is regulated by said voltage of said output bus and after the turning-on of the switching power supply said output voltage of the switching power supply is regulated by the controller.

8. The control circuit according to claim 7, wherein said switching element is a switch and in that said switch is closed before the turning-on of the switching power supply such that a level of a reference voltage at an input of the controller is determined by said voltage of said output bus and in that said switch is opened after the turning-on of the switching power supply such that the level of said reference voltage is determined by a bias voltage.

9. The control circuit according to claim 8, further comprising a resistor connected between the output voltage and said reference voltage for enabling said capacitive element to memorize said output condition.

10. The control circuit according to claim 8, further comprising means for limiting the reference voltage.

11. The control circuit according to claim 1, further comprising a slope limiting capacitor connected between the output voltage and an input of the controller for limiting a slope of the output voltage.

12. The control circuit according to claim 4, wherein said capacitive element is a slope limiting capacitor.

13. The control circuit according to claim 4, further comprising a resistor connected between an output of the controller and said capacitive element for enabling said capacitive element to memorize said output condition.

14. A switching power supply with a control circuit according to claim 1.

15. The switching power supply according to claim 14, further comprising a Pulse Width Modulator for controlling a switching of the switching power supply.

16. The switching power supply according to claim 14 or 15, wherein an output capacitor is connected to an output of the switching power supply.

17. An arrangement of at least two switching power supplies, an output of each switching power supply being connected to a common output bus, where at least one of said at least two switching power supplies is built according to claim 14 or 15.

18. A method for powering up a switching power supply connected to a powered output bus by controlling a switching of the switching power supply with a control circuit, wherein before the switching power supply is turned on a controller of said control circuit is regulated by a voltage of said powered output bus, and in that after the switching power supply is turned on the output voltage of the switching power supply is regulated by said controller.

19. A control circuit for powering-up a switching power supply for use with a powered output bus; the control circuit comprising:
   (a) a controller having a control output for connection in controlling relation to a switching element of the switching power supply;
   (b) connecting circuitry connected in controlling relation with the controller and responsive to the voltage on the powered output bus to control the controller prior to turning on of the switching power supply, and
   (c) controller output connection circuitry for connecting in regulating relation to the switching power supply for regulation of the switching power supply after turning on of the switching power supply.

20. A control circuit for powering up a switching power supply connected to a powered output bus having a voltage thereon; the circuit comprising:
   (a) a controller having a connection for connecting to the powered output bus and comprising:
   (i) means for regulating an output voltage of the switching power supply after turning-on of the switching power supply by controlling switching in the switching power supply; and
   (b) means for regulating the controller by the voltage on the powered output bus before turning-on of the switching power supply.

21. The control circuit according to claim 20, wherein the means for regulating the controller comprises means for memorizing the voltage on the powered output bus prior to turning on the switching power supply.

22. The control circuit according to claim 21, wherein the means for memorizing the voltage on the powered output bus comprises a capacitor connected to have a voltage applied thereto from the powered output bus.

23. The control circuit according to claim 22, wherein the controller comprises an operational amplifier having an input operatively connected with the capacitor and having an output operatively connected in controlling relation with the switching power supply.

24. The control circuit according to claim 23, further comprising a means for developing a reference voltage and means for switching a controlling voltage input to the operational amplifier from a voltage derived from the capacitor prior to turning on the switching power supply to a voltage derived from the reference voltage when the switching power supply is turned on.

25. A control circuit for powering up a switching power supply supplying power to a powered output bus; the control circuit comprising:
(a) a controller having an output and at least one control input, the controller output having an output voltage dependent upon a voltage level applied to the control input of the controller;
(b) the controller output being connected to the switching power supply in switching control thereof;
(c) an input to the control circuit for connection with the powered output bus;
(d) circuitry connecting the input to the control circuit with the at least one control input of the controller and operative to apply to the control input of the controller a voltage derived from a voltage applied to the input to the control circuit from a connected powered output bus to set the output voltage of the controller prior to turning on of the switching power supply; and
(e) circuitry establishing a reference voltage upon start up of the switching power supply and operatively connected with the at least one control input of the controller to set the output voltage of the controller to thereby regulate the switching power supply after turning on of the switching power supply.

26. The control circuit of claim 25, wherein the controller includes an operational amplifier.

27. The control circuit of claim 25, wherein the circuitry connecting the input to the control circuit with the at least one control input of the controller includes a capacitor connected to memorize the voltage derived from a voltage applied to the input to the control circuit from a connected powered output bus prior to start-up of the switching power supply.

28. The control circuit of claim 27, further comprising reference voltage establishing circuitry and a switch for switching a voltage applied to at least one input to the controller from the memorized voltage of the capacitor to the reference voltage upon turning-on of the switching power supply.

\* \* \* \* \*